(12) United States Patent
Zou et al.

(10) Patent No.: US 11,740,089 B2
(45) Date of Patent: Aug. 29, 2023

(54) MEMS INERTIAL SENSOR, APPLICATION METHOD OF MEMS INERTIAL SENSOR, AND ELECTRONIC DEVICE

(71) Applicant: SENODIA TECHNOLOGIES (SHAOXING) CO., LTD., Shaoxing (CN)

(72) Inventors: Bo Zou, Shanghai (CN); Shuang Liu, Shanghai (CN); Yan Huang, Shanghai (CN)

(73) Assignee: SENODIA TECHNOLOGIES (SHAOXING) CO., LTD., Shaoxing (CN)

( * ) Notice: Subject to any disclaimer, the term of this patent is extended or adjusted under 35 U.S.C. 154(b) by 0 days.

(21) Appl. No.: 17/801,800

(22) PCT Filed: Apr. 2, 2020

(86) PCT No.: PCT/CN2020/082928
§ 371 (c)(1),
(2) Date: Aug. 24, 2022

(87) PCT Pub. No.: WO2021/168991
PCT Pub. Date: Sep. 2, 2021

(65) Prior Publication Data
US 2023/0088805 A1    Mar. 23, 2023

(30) Foreign Application Priority Data
Feb. 26, 2020  (CN) .......................... 202010126245.4

(51) Int. Cl.
*G01P 15/125* (2006.01)
*G01C 19/5776* (2012.01)

(52) U.S. Cl.
CPC ........ *G01C 19/5776* (2013.01); *G01P 15/125* (2013.01)

(58) Field of Classification Search
CPC .......................... G01C 19/5776; G01P 15/125
See application file for complete search history.

(56) References Cited

U.S. PATENT DOCUMENTS 6,370,937 B2 * 4/2002 Hsu .................... G01C 19/5719
73/1.37
7,982,720 B2 * 7/2011 Rosenberg ............ G06F 1/1626
345/173
(Continued)

FOREIGN PATENT DOCUMENTS

CN        1321243 A      11/2001
CN        1764843 A      4/2006
(Continued)

OTHER PUBLICATIONS

Donguk Max Yang, et al., A Micro Thermal and Stress Isolation Platform for Inertial Sensors, IEEE, 2018.
(Continued)

*Primary Examiner* — Elias Desta
(74) *Attorney, Agent, or Firm* — Bayramoglu Law Offices LLC

(57) ABSTRACT

Provided is an application method of a Micro Electro Mechanical Systems (MEMS) inertial sensor and an electronic device. An application method of an accelerometer includes: based on an influence of a strain, generated under the action of an external force, of the accelerometer on a detection signal of the accelerometer, adopting the detection signal to reflect the external force. An application method of a gyroscope includes: based on an influence of a strain, generated under the action of an external force, of the gyroscope on a detection signal of the gyroscope, adopting the detection signal to reflect the external force. Further provided is an electronic device adopting the foregoing methods.

20 Claims, 6 Drawing Sheets

(56) References Cited

U.S. PATENT DOCUMENTS

| | | | |
|---|---|---|---|
| 10,352,960 B1 | 7/2019 | Shcheglov et al. | |
| 2011/0174074 A1 | 7/2011 | Li et al. | |
| 2014/0009175 A1* | 1/2014 | Kalnitsky | G01P 15/125 |
| | | | 324/679 |
| 2014/0283605 A1* | 9/2014 | Baldasarre | G01P 15/125 |
| | | | 73/514.32 |

FOREIGN PATENT DOCUMENTS

| | | |
|---|---|---|
| CN | 102057249 A | 5/2011 |
| CN | 102155944 A | 8/2011 |
| CN | 103154746 A | 6/2013 |
| CN | 103162872 A | 6/2013 |
| CN | 104817051 A | 8/2015 |
| CN | 105158511 A | 12/2015 |
| CN | 105823907 A | 8/2016 |
| CN | 105874312 A | 8/2016 |
| CN | 106153241 A | 11/2016 |
| CN | 206348355 U | 7/2017 |
| CN | 107037237 A | 8/2017 |
| CN | 107271722 A | 10/2017 |
| CN | 108020687 A | 5/2018 |
| CN | 108253953 A | 7/2018 |
| CN | 108369098 A | 8/2018 |
| CN | 108692836 A | 10/2018 |
| CN | 109205545 A | 1/2019 |
| CN | 109313095 A | 2/2019 |
| CN | 110296684 A | 10/2019 |
| CN | 110411615 A | 11/2019 |
| CN | 110879303 A | 3/2020 |
| CN | 111208317 A | 5/2020 |
| EP | 2693183 A1 | 2/2014 |
| EP | 3120158 B1 | 5/2018 |
| EP | 3315460 A1 | 5/2018 |
| KR | 20180045811 A | 5/2018 |

OTHER PUBLICATIONS

Li Xiaoyang, et al., Status and development trend of MEMS inertial sensors, Journal of Telemetry, Tracking and Command, 2019, pp. 1-13, 21, vol. 40, No. 6.

* cited by examiner

US 11,740,089 B2

MEMS INERTIAL SENSOR, APPLICATION METHOD OF MEMS INERTIAL SENSOR, AND ELECTRONIC DEVICE

CROSS REFERENCE TO THE RELATED APPLICATIONS

This application is the national phase entry of International Application No. PCT/CN2020/082928, filed on Apr. 2, 2020, which is based upon and claims priority to Chinese Patent Application No. 202010126245.4, filed on Feb. 26, 2020, the entire contents of which are incorporated herein by reference.

TECHNICAL FIELD

The present disclosure relates to the field of Micro Electro Mechanical Systems (MEMS), and particularly relates to a MEMS inertial sensor, an application method of the MEMS inertial sensor, and an electronic device.

BACKGROUND

The MEMS has been increasingly widely used in consumer electronics, medical devices, automobiles, and other products by virtue of its small size, low cost, excellent integration, and the like. Inertial sensors are used on a large scale, and a variety of controllers, such as air mouses, true wireless stereo (TWS) headphones, augmented reality (AR) devices, and virtual reality (VR) devices, are also used in a wide range of applications.

In some electronic devices, various sensors are configured according to the use of the device. For example, in the TWS headphones, MEMS microphones are configured to acquire acoustical signals, the inertial sensors are configured to perform gesture detection, and pressure sensors are configured to sense external trigger signals.

With the miniaturization of the electronic devices and the popularity of wearable intelligent products, persons skilled in the art are committed to further reducing the size and cost of the products.

SUMMARY

In order to solve the problems of the prior art, the present disclosure provides an application method of an accelerometer. Based on an influence of a strain, generated under the action of an external force, of the accelerometer on a detection signal of the accelerometer, the detection signal is adopted to reflect the external force.

Further, the accelerometer includes a detection capacitor; the detection signal is equivalent to a capacitance measurement value defined by the detection capacitor; and acceleration and the external force are reflected by the capacitance measurement value. The capacitance measurement value mentioned in this paper refers to a signal based on the detection capacitor. The signal can be obtained by direct detection or after certain conversion. For example, the signal may be an analog signal, a digital signal, a voltage signal, or a current signal, which is not limited herein.

Further, a reference limit of the capacitance measurement value is set. Whether or not the accelerometer is subjected to the external force is determined according to a comparison between the capacitance measurement value and the reference limit of the capacitance measurement value.

Further, the detection capacitor includes a first detection capacitor and a second detection capacitor, where the first detection capacitor defines a first capacitance measurement value, and the second detection capacitor defines a second capacitance measurement value. The first capacitance measurement value and the second capacitance measurement value are changed in opposite directions. The acceleration is reflected by a difference between the first capacitance measurement value and the second capacitance measurement value. When the strain is generated on the accelerometer, the external force is reflected by a corresponding change of the first capacitance measurement value and/or the second capacitance measurement value.

Further, the first capacitance measurement value and the second capacitance measurement value are converted into a detection item by an operation; a detection reference limit is set. When the detection item exceeds the detection reference limit or a threshold value set based on the detection reference limit, it is determined that the accelerometer is subjected to the external force. Conversion, performed by the operation, of the first capacitance measurement value and the second capacitance measurement value as well as a correlation operation and processing on signals in this paper are fulfilled by a circuit mode and/or a processor. For example, when the accelerometer is used in an electronic device, the conversion performed by the operation and determination on whether or not the external force exists are fulfilled by a processor in the electronic device. In addition, a specific way to fulfill the conversion and the determination is not limited herein.

Further, a magnitude of the external force is reflected by an extent of the detection item exceeding the detection reference limit.

Further, a sum of the first capacitance measurement value and the second capacitance measurement value is taken as the detection item, and the detection reference limit is set accordingly.

Further, a sum of a reciprocal of the first capacitance measurement value and a reciprocal of the second capacitance measurement value is taken as the detection item, and the detection reference limit is set accordingly.

Further, a sum of the square of the first capacitance measurement value and the square of the second capacitance measurement value is taken as the detection item, and the detection reference limit is set accordingly.

Further, a value of the acceleration measured by the accelerometer is corrected based on the detection item.

Further, the accelerometer is a multiaxial accelerometer, where the detection signal of at least one axis is adopted to reflect the external force.

The present disclosure further provides an accelerometer sensing the external force by the application method of the accelerometer.

The present disclosure further provides an application method of a gyroscope. Based on an influence of a strain, generated under the action of an external force, of the gyroscope on a detection signal of the gyroscope, the detection signal is adopted to reflect the external force.

Further, a quadrature error signal in the detection signal is adopted to reflect the external force.

Further, a reference limit of a quadrature error is set; and whether or not the gyroscope is subjected to the external force is determined according to a comparison between the quadrature error signal and the reference limit of the quadrature error.

Further, when the quadrature error signal deviates from the reference limit of the quadrature error or a threshold value set based on the reference limit of the quadrature error, it is determined that the gyroscope is subjected to the external force.

Further, a magnitude of the external force is reflected by an extent of the quadrature error signal deviating from the reference limit of the quadrature error.

Further, the gyroscope includes a detection capacitor; the detection signal is defined by the detection capacitor; and an angular velocity measurement signal and the quadrature error signal are demodulated from the detection signal to respectively reflect an angular velocity and the external force.

Further, a value of the angular velocity measured by the gyroscope is corrected based on a change of the quadrature error signal.

Further, the gyroscope is a multiaxial gyroscope, where the detection signal of at least one axis is adopted to reflect the external force.

The present disclosure further provides a gyroscope sensing the external force by the application method of the gyroscope.

The present disclosure provides a sensor which includes the accelerometer sensing an external force by the application method of an accelerometer and/or the gyroscope sensing an external force by the application method of a gyroscope.

The present disclosure provides an electronic device which includes an accelerometer and/or a gyroscope, where at least one of the accelerometer and the gyroscope is configured to sense an external force. The accelerometer senses the external force by the application method of an accelerometer. The gyroscope senses the external force by the application method of a gyroscope.

Further, the electronic device includes a drive component. The drive component is correspondingly configured to directly or indirectly act on the accelerometer and/or the gyroscope, such that the strain is generated on the accelerometer and/or the gyroscope by applying a force to the drive component.

Further, the drive component includes a limit part, where the limit part is configured to limit the maximum force applied by the drive component to the accelerometer and/or the gyroscope.

Further, the drive component includes a plurality of gears, and maximum forces applied by the plurality of gears to the accelerometer and/or the gyroscope are not all equal.

Further, the drive component includes an adjustment part, where the adjustment part is configured to adjust a force applied by the drive component to the accelerometer and/or the gyroscope.

Further, the accelerometer and the gyroscope are respectively arranged at different positions of the electronic device to sense the external force at the corresponding position.

Further, the external force is sensed through the accelerometer and/or the gyroscope to achieve a control over the electronic device and/or a determination on a state of the electronic device.

Based on an influence of the external force on existing detection outputs of the accelerometer and the gyroscope, the accelerometer and the gyroscope can be used as pressure sensing devices on the premise that normal functions of the accelerometer and the gyroscope are fulfilled, such that low costs and miniaturization of related electronic products can be achieved.

In order to make the objectives, features, and effects of the present disclosure be fully understood, the concepts, specific structures, and technical effects of the present disclosure are further described below in conjunction with the accompanying drawings.

DETAILED DESCRIPTION OF THE EMBODIMENTS

Figure 1:
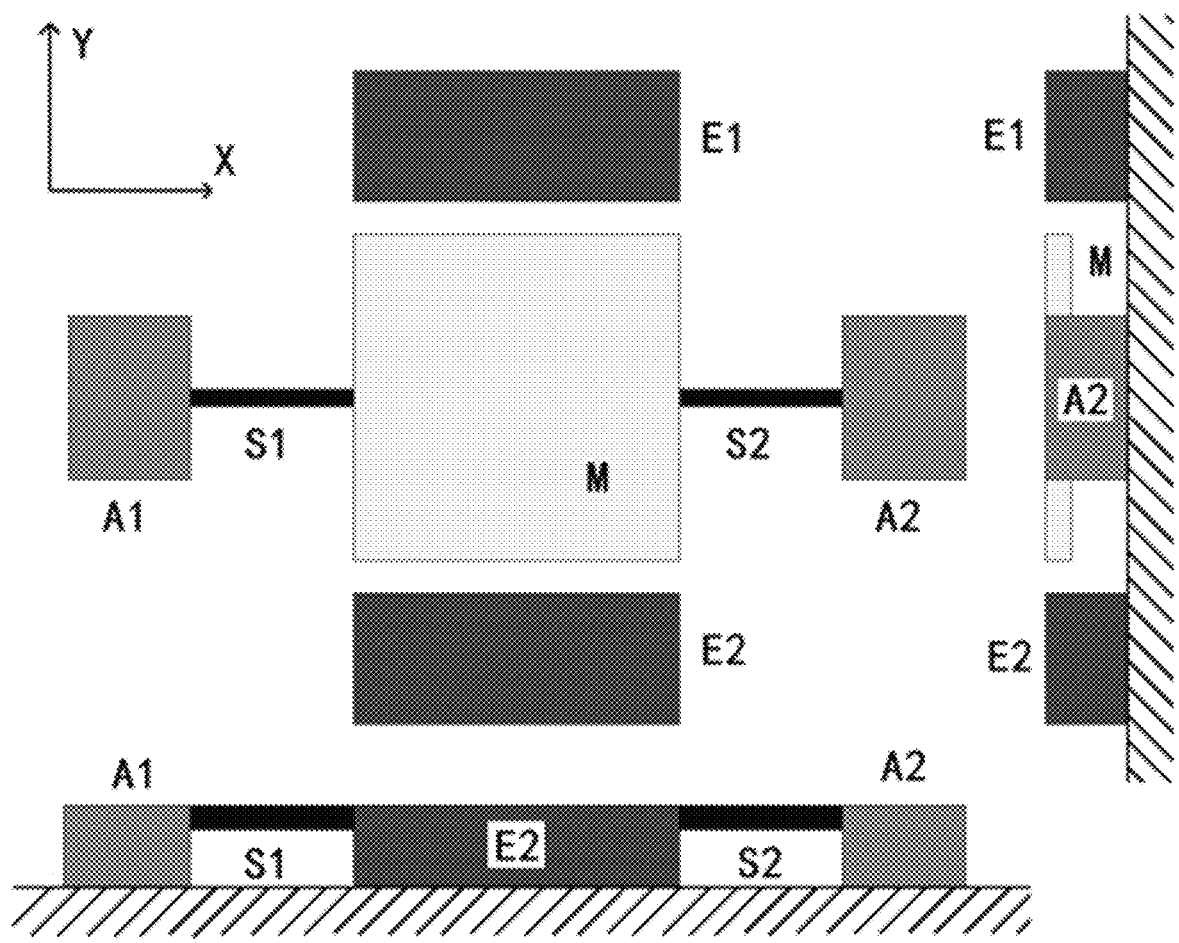
FIG. 1 shows a structural diagram of a prior accelerometer.

In the description of embodiments of the present disclosure, the terms such as "upper", "lower", "front", "back", "left", "right", "vertical", "horizontal", "top", "bottom", "inner", "outer", "clockwise", and "counterclockwise" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms should not be construed as a limitation to the present disclosure. In the drawings, namely schematic diagrams or conceptual diagrams, the relationship between the thickness and width of each part, the proportional relationship among the parts, and the like may not reflect the actual dimensions and proportional relationship among the parts.

The operating principle of an accelerometer is explained with an accelerometer shown in FIG. 1 as an example. The accelerometer shown in FIG. 1 includes a fixed anchor A1, a fixed anchor A2, a spring beam S1, a spring beam S2, a proof mass M, a fixed electrode E1, and a fixed electrode E2. A right structure in FIG. 1 shows a right view of the intermediate accelerometer, and a lower structure in FIG. 1 shows a bottom view of the intermediate accelerometer.

The fixed anchor A1 and the fixed anchor A2 are fixedly connected to a supporting base and respectively arranged on two sides of the proof mass M in an X-axis direction. The proof mass M is respectively connected to the fixed anchor A1 and the fixed anchor A2 through the spring beam S1 and the spring beam S2. The spring beam S1 and the spring beam S2 both extend in the X-axis direction, and the proof mass M is movable in a Y-axis direction.

The fixed electrode E1 and the fixed electrode E2 are fixedly connected to the supporting base and respectively arranged on two sides of the proof mass M in the Y-axis direction. A detection capacitor formed by the proof mass M and the fixed electrode E1 defines a capacitance $C_1$, and a detection capacitor formed by the proof mass M and the fixed electrode E2 defines a capacitance $C_2$. When no acceleration is input in the Y-axis direction, the distance between the proof mass M and the fixed electrode E1 is equal to the distance between the proof mass M and the fixed electrode E2, and the capacitance $C_1$ is equal to the capacitance $C_2$. When subjected to gravitational acceleration in a negative direction of a Y axis (namely a vertically downward direction in FIG. 1), the proof mass M connected between the spring beam S1 and the spring beam S2 shifts in the negative direction of the Y axis (downwards). In this case, the proof mass M gets close to the fixed electrode E2 and gets away from the fixed electrode E1, such that the capacitance $C_2$ is increased, and the capacitance $C_1$ is decreased. It is detected by a differential circuit that $\Delta C = C_1 - C_2$, such that the gravitational acceleration input to the proof mass M in the negative direction of the Y axis can be obtained. Similarly, when the proof mass M is subjected to gravitational acceleration in a positive direction of the Y axis (namely a vertically upward direction in FIG. 1), the gravitational acceleration acting on the proof mass M in the positive direction of the Y axis can be obtained based on $\Delta C = C_1 - C_2$.

For any uniaxial accelerometer, in a case where acceleration a is equal to 0, the proof mass M is located at an equilibrium position, and $C_1 = C_2 = C_0$.

$$C_0 = \varepsilon \varepsilon_0 A / d_0 \quad (1)$$

where $\varepsilon$ represents a relative dielectric constant, $\varepsilon_0$ represents dielectric constant of vacuum, A represents area of capacitance electrodes, and do represents a distance between adjacent two of the capacitance electrodes.

In a case where the acceleration a is not equal to 0, the proof mass M deviates from the equilibrium position under the action of an inertial force generated by the acceleration, such that the capacitance $C_1$ and the capacitance $C_2$ are changed, and corresponding capacitance values are:

$$C_1 = \frac{\varepsilon \varepsilon_0 A}{d_0 - \Delta d} \quad (2)$$

$$C_2 = \frac{\varepsilon \varepsilon_0 A}{d_0 + \Delta d} \quad (3)$$

where $\Delta d$ represents a displacement, generated under the action of the inertial force, of the proof mass M.

A difference value of the capacitance $C_1$ and the capacitance $C_2$ is:

$$\Delta C = C_1 - C_2 = \frac{2\varepsilon \varepsilon_0 A \Delta d}{d_0^2 - \Delta d^2} \quad (4)$$

where, as $\Delta d \ll d_0$, $\Delta d^2$ is omitted; and formula (1) is substituted into formula (4), such that the difference value of the capacitance $C_1$ and the capacitance $C_2$ is:

$$\Delta C = 2C_0 (\Delta d / d_0) \quad (5)$$

Measurement on the acceleration of the accelerometer in the Y-axis direction is described above. Similarly, gravitational acceleration in the X-axis direction and gravitational acceleration in a Z-axis direction can be measured through a similar structure, such that a triaxial accelerometer is obtained.

Figure 2:
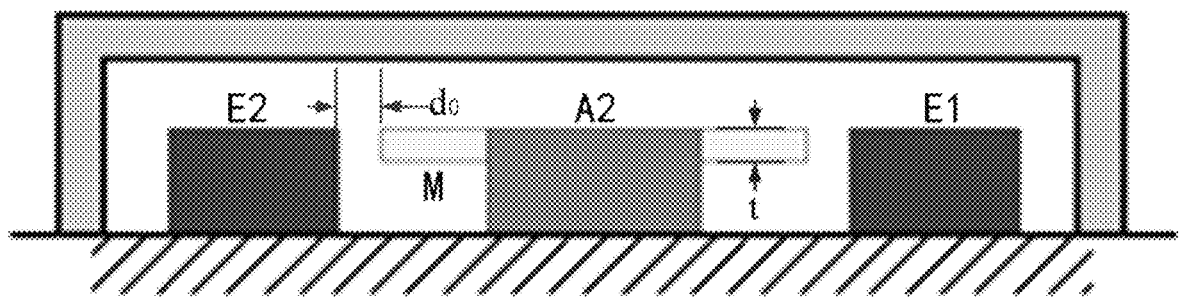
FIG. 2 and FIG. 3 respectively show structural diagrams of the accelerometer in FIG. 1 before and after deformation of the accelerometer.
Figure 3:
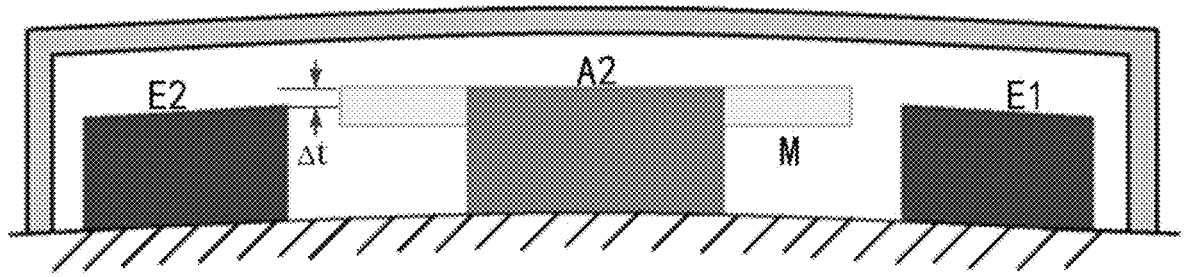

FIG. 2 and FIG. 3 respectively show changes of the accelerometer in structure before and after a strain is generated on the accelerometer.

Figure 4:
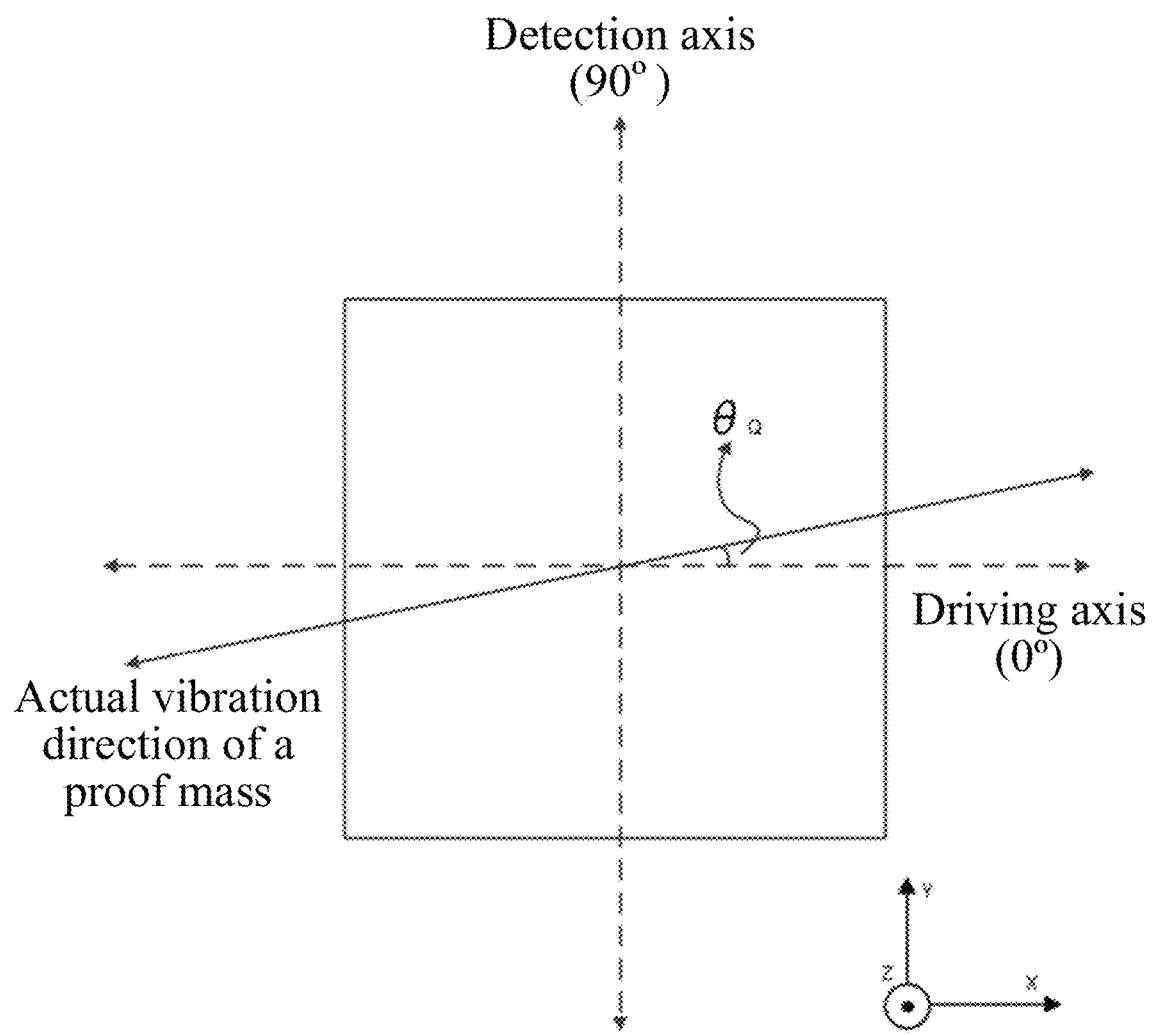
FIG. 4 shows a quadrature coupling diagram of a prior gyroscope.

FIG. 4 shows a packaged accelerometer (showing a uniaxial detection structure in FIG. 1). The proof mass M is respectively connected to the fixed anchor A1 and the fixed anchor A2 through the spring beam S1 (not shown) and the spring beam S2 (not shown). The fixed anchor A1 and the fixed anchor A2 are fixed to the supporting base. The capacitance $C_1$ is formed by the proof mass M and the fixed electrode E1, and the capacitance $C_2$ is formed by the proof mass M and the fixed electrode E2, and the fixed electrode E1 and the fixed electrode E2 are fixed to the supporting base.

As shown in FIG. 3, under the action of an external force, the whole packaged structure is deformed to a certain extent. As a result, overlap area of the proof mass M and the fixed electrode E1 as well as an overlap area of the proof mass M and the fixed electrode E2 is changed. Thus, the external force can be reflected by corresponding changes of the capacitance $C_1$ and the capacitance $C_2$, and specific ways include, but not limited to, the following.

In an embodiment, the external force is determined by the changes of the detection capacitors $C_1 + C_2$; and according to formula (2) and formula (3), the following formula can be obtained:

$$Cs = C_1 + C_2 = \frac{2\varepsilon \varepsilon_0 A d_0}{d_0^2 - \Delta d^2} \quad (6)$$

Similarly, as $\Delta d \ll d_0$, $\Delta d^2$ is omitted; and formula (1) is substituted into formula (6), such that a sum of the capacitance $C_1$ and the capacitance $C_2$ is:

$$Cs = 2C_0 \quad (7)$$

when the accelerometer is in a normal state, Cs is approximately equal to $2C_0$. When the accelerometer is deformed under the action of the external force, the overlap area of the proof mass M and the fixed electrode E1 as well as the overlap area of the proof mass M and the fixed electrode E2 are changed. In this embodiment, the overlap area is reduced, and the capacitance $C_1$ and the capacitance $C_2$ are correspondingly decreased. After the accelerometer is deformed, the detection capacitor formed by the proof mass M and the fixed electrode E1 and the detection capacitor formed by the proof mass M and the fixed electrode E2 are respectively denoted by $C_1'$ and $C_2'$, so as to be distinguished from and compared with the capacitance $C_1$ and the capacitance $C_2$ in the normal state of the accelerometer.

Figure 5:
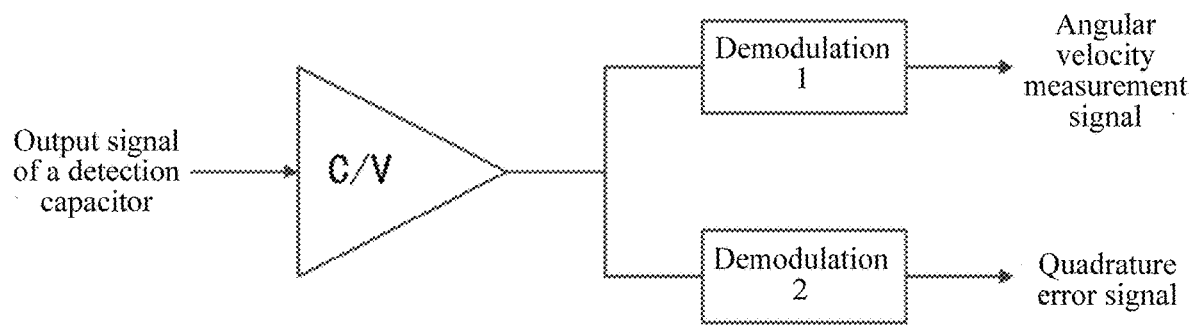
FIG. 5 shows a processing flow chart of an output signal of the gyroscope in an embodiment of the present disclosure.

As shown in FIG. 5, after the accelerometer is deformed, and in the case where the acceleration a is equal to 0, the proof mass M is located at the equilibrium position, and $C_1' = C_2' = C_0'$.

$$C_0' = \varepsilon \varepsilon_0 A' / d_0 \quad (8)$$

$$A' = A(1 - \Delta t / t) \quad (9)$$

where, A' represents the area of the capacitance electrode after the accelerometer is deformed, t represents a thickness of the proof mass M, $\Delta t$ represents a deviation distance of the capacitance electrode.

According to formula (2), formula (3), and formula (6), the following formulas can be obtained:

$$C_1' = \frac{\varepsilon\varepsilon_0 A'}{d_0 - \Delta d} \quad (10)$$

$$C_2' = \frac{\varepsilon\varepsilon_0 A'}{d_0 - \Delta d} \quad (11)$$

$$Cs' = C_1' + C_2' = \frac{2\varepsilon\varepsilon_0 A' d_0}{d_0^2 - \Delta d^2} \quad (12)$$

Similarly, as $\Delta d \ll d_0$, $\Delta d^2$ is omitted; and formula (8) is substituted into formula (12), such that a sum of the capacitance $C_{40}'$ and the capacitance $C_2'$ is:

$$Cs' = 2C_0' \quad (13)$$

From formula (7) and formula (13), in the normal state or any deformation state of the accelerometer, no matter whether or not the acceleration is input, the sum of the two detection capacitors is hardly changed, and is basically regarded as a fixed value. This value is correspondingly changed before and after the deformation of the accelerometer (due to a change of A). In this embodiment, the sum of the capacitances is decreased from Cs to Cs', such that Cs can be detected. $2C_0$ is adopted as a reference to be compared with Cs obtained according to actual detection. If Cs obtained according to the actual detection is less than $2C_0$, the accelerometer is deformed.

In this embodiment, $2C_0$ is adopted as the reference to be compared with Cs obtained according to the actual detection. Definitely, a reference standard can be adaptively adjusted based on an actual situation. For example, $2C_0$ is fluctuated by a certain value or percentage to be adopted as the reference standard, so as to be compared with Cs obtained according to the actual detection.

In addition, in a case where the external force is increased, A is further reduced, and Cs correspondingly deviates more from $2C_0$ or the reference standard on which Cs is based. Therefore, the external force can be quantified and utilized according to a difference of $2C_0$ and Cs obtained according to the actual detection. Quantification, described here and below, of the external force or action of the external force refers to that different external forces or action of the external forces can be reflected by different physical quantities or different values, and it is not necessary to measure or calculate the actual magnitude of the external force in mechanical significance. For example, when the accelerometer is used in an electronic device, commands can be distinguished according to the magnitude of the external force, so as to correspond to different operations or reflect different states.

In an embodiment, the action of the external force is determined by detecting a change of $1/C_1 + 1/C_2$; and according to formula (2) and formula (3), the following formula can be obtained:

$$Cr = 1/C_1 + 1/C_2 = 2d_0/\varepsilon\varepsilon_0 A \quad (14)$$

Substituting into formula (1), the following formula can be obtained:

$$1/Cr = C_0/2 \quad (15)$$

Similarly, according to formula (8), formula (10), and formula (11), the following formulas can be obtained:

$$Cr' = 1/C_1' + 1/C_2' = 2d_0/\varepsilon\varepsilon_0 A' \quad (16)$$

$$1/Cr' = C_0'/0 \quad (17)$$

From formula (15) and formula (17), in the normal state or any deformation state of the accelerometer, whether or not the acceleration is input, $1/C_1 + 1/C_2$ is not changed and is regarded as a fixed value. This value is correspondingly changed before and after the deformation of the accelerometer (due to a change of A), such that 1/Cr can be detected. $C_0/2$ is adopted as a reference to be compared with 1/Cr obtained according to actual detection. If 1/Cr obtained according to the actual detection is less than $C_0/2$, the accelerometer is deformed.

Similarly, a reference standard can be adaptively adjusted based on an actual situation. For example, $C_0/2$ is fluctuated by a certain value or percentage to be adopted as the reference standard, so as to be compared with 1/Cr obtained according to the actual detection.

Similarly, in a case where the external force is increased, A is further reduced, and 1/Cr correspondingly deviates more from $C_0/2$ or the reference standard on which 1/Cr is based. Therefore, the external force can be quantified and utilized according to a difference of $C_0/2$ and 1/Cr obtained according to the actual detection.

In an embodiment, the action of the external force is determined by a change of the detection capacitors $C_1^2 + C_2^2$. According to formula (2) and formula (3), the following formula can be obtained:

$$Csq = C_1^2 + C_2^2 = \frac{2(\varepsilon\varepsilon_0 A)^2(d_0^2 + \Delta d^2)}{(d_0^2 - \Delta d^2)^2} \quad (18)$$

Similarly, as $\Delta d \ll d_0$, $\Delta d^2$ is omitted; and formula (1) is substituted into formula (18) to obtain the following formula:

$$Csq = 2C_0^2 \quad (19)$$

Similarly, according to formula (8), formula (10), and formula (11), the following formula can be obtained:

$$Csq' = 2C_0'^2 \quad (20)$$

From formula (18) and formula (20), whether or not the acceleration is input, $C_1^2 + C_2^2$ is hardly changed and is basically regarded as a fixed value. This value is correspondingly changed before and after the deformation of the accelerometer (due to a change of A), such that Csq can be detected. $2C_0^2$ is adopted as a reference to be compared with Csq obtained according to actual detection. If Csq obtained according to the actual detection is less than $2C_0^2$, the accelerometer is deformed.

Similarly, a reference standard can be adaptively adjusted based on an actual situation. For example, $2C_0^2$ is fluctuated by a certain value or percentage to be adopted as the reference standard, so as to be compared with Csq obtained according to the actual detection.

Similarly, in a case where the external force is increased, A is further reduced, and Csq correspondingly deviates more from $2C_0^2$ or the reference standard on which Csq is based. Therefore, the external force can be quantified and utilized according to a difference of $2C_0^2$ and Csq obtained according to the actual detection.

Similarly, according to formula (1), formula (7), formula (8), formula (9), and formula (13), the following formula can be obtained:

$$Cs' = Cs(1 - \Delta t/t) \quad (21)$$

Similarly, according to formula (1), formula (8), formula (9), formula (19), and formula (20), the following formula can be obtained:

$$Csq' = Csq(1 - \Delta t/t)^2 \quad (22)$$

From formula (21) and formula (22), after the accelerometer is deformed, Cs' deviates from Cs in the normal state of the accelerometer by Δt/t times, and Csq' deviates from Csq in the normal state of the accelerometer by [1−(1−Δt/t)²] times.

With Δt/t=5% as an example, according to formula (21) and formula (22), Cs' is equal to 0.95Cs, and Csq' is approximately equal to 0.9Csq; that is, under the same external force, Cs and Csq are adopted as detection items to determine the external force. Cs' deviates from Cs in the normal state of the accelerometer by 5%, and Csq' deviates from Csq in the normal state of the accelerometer by nearly 10%. It can be seen that Csq can achieve higher sensitivity. However, Csq may be more difficult to obtain compared with Cs. A specific choice of Cs or Csq is determined based on an actual situation.

As described above, the influence of the external force on the accelerometer can be reflected by the changes (including changes of $C_1$ and $C_2$ after the operation based on $C_1$ and $C_2$ is performed) of the capacitance $C_1$ and the capacitance $C_2$, and the external force can be further quantified to be utilized.

Furthermore, based on derivation of formula (5), the difference value of the two detection capacitors after the deformation of the accelerometer can be obtained through the following formula:

$$\Delta C' = 2C_0'(\Delta d/d_0) \quad (23)$$

From formula (5) and formula (23), after the accelerometer is deformed, ΔC for calculating the acceleration is correspondingly changed, resulting in a certain influence on a calculation of the acceleration. In spite of this, the influence is quite limited. In an implementation applied to a headphone, Δt/t is controlled to be less than 5%, ΔC is changed by a percent less than 5%. Such errors are acceptable for gesture detection of the headphone.

In other embodiments, in order to guarantee measurement accuracy of the acceleration when the accelerometer is configured to detect the external force, a quantification result obtained by detection on the external force is adopted to correct measurement data of the acceleration, such that an influence of the external force on the measurement accuracy of the acceleration can be controlled to be within an extremely small range.

In the above embodiments, Cs, Cr, and Csq are respectively adopted as detection items to determine whether or not the accelerometer is subjected to the external force. With regard to the detection items, a person skilled in the art has many other choices based on the concept of the present disclosure. Selection of above detection items aims to explain that a detection output of the prior accelerometer can be adopted to determine whether or not the accelerometer is subjected to an external force, and the external force can be quantified.

The above embodiments are described with the uniaxial accelerometer as an example. The principle of the uniaxial accelerometer is the same as that of a biaxial or triaxial accelerometer. In a case where the biaxial or triaxial accelerometer is used, the external force can be determined by a detection signal of only one axis; the external force can also be determined by detection signals of two axes or detection signals of three axes.

FIG. 4 shows a quadrature coupling diagram of a capacitive MEMS gyroscope. The capacitive MEMS gyroscope manufactured based on micromachining detects an angular velocity signal mainly by a Coriolis force, and has two operation modes, namely a driving mode and a detection mode. In an ideal case, after an electric signal at an intrinsic frequency is applied to a driving end of the gyroscope in the driving mode, a proof mass of the gyroscope vibrates in a reciprocating manner at the intrinsic frequency along a driving axis (namely an X axis in FIG. 4). When an angular velocity is input in a Z-axis direction from the outside, the proof mass vibrates along a detection axis (namely a Y axis in FIG. 4) under the action of the Coriolis force. A vibration amplitude is linearly related to the magnitude of the angular velocity, such that the magnitude of a current angular velocity can be obtained by measuring the vibration amplitude of the proof mass on the detection axis.

The defects of a manufacturing process based on the micromachining cause a nonideal structure of the gyroscope. During actual operation, the proof mass does not vibrate exactly along the driving axis in the driving mode, and an actual vibration direction may deviate from the driving axis by a small angle. By means of this angle of deviation, the vibration along the driving axis can be directly coupled to the detection axis, such that a detection signal can still be output from the gyroscope even if the angular velocity is equal to zero. Such phenomenon is called a quadrature error.

A quadrature error signal of the gyroscope is very likely to be influenced by a stress and deformation. However, due to a 90° phase difference of the quadrature error signal and the detection signal, the quadrature error signal can be avoided from being demodulated during demodulation, such that a change of the quadrature error signal has no influence on a normal result output of the gyroscope. Thus, an influence of the external force applied to the gyroscope can be reflected by the demodulation on the quadrature error signal, and the external force can be quantified.

FIG. 5 shows a processing flow chart of a signal output from the gyroscope in this embodiment. After a signal output from a detection capacitor is converted by a capacitance/voltage (C/V), the quadrature error signal and an angular velocity measurement signal for manifesting the angular velocity are demodulated.

As described above, the quadrature error arises from a nonideal structure caused by the manufacturing process based on the micromachining and is determined by a micromechanical structure, When the gyroscope is in a normal state, whether or not the angular velocity is input, the quadrature error signal is not changed.

Nevertheless, when the gyroscope is stressed and deformed under the action of the external force, the quadrature error signal is greatly changed. In this embodiment, when the gyroscope is in the normal state, the quadrature error signal obtained by the demodulation is denoted by $S_0$. Thus, the $S_0$ can be adopted as a reference to be compared with a quadrature error signal obtained according to an actual detection. Definitely, a reference standard can be adaptively adjusted based on an actual situation. For example, the $S_0$ is fluctuated by a certain value or percentage to be adopted as the reference standard, so as to be compared with the quadrature error signal obtained according to the actual detection.

In addition, in a case where the external force is increased, the influence on the quadrature error signal increases correspondingly, and the quadrature error signal obtained according to the actual detection correspondingly deviates more from the $S_0$ or the reference standard on which the $S_0$ is based. Therefore, the external force can be quantified and utilized according to a difference of the $S_0$ and the quadrature error signal obtained according to the actual detection.

The gyroscope has a detection capacitor (referring to FIG. 2 and FIG. 3) similar to that of the accelerometer. During deformation, an output of the detection capacitor of the gyroscope is influenced to a certain extent. In spite of this, the influence can be basically controlled within an acceptable range and is easy to control.

Although the influence of the external force on the gyroscope with respect to a stress and deformation acts on both the angular velocity measurement signal and the quadrature error signal, the influence on the quadrature error signal is considerably greater than that on the angular velocity measurement signal. In an actual experiment, during deformation of gyroscopes having different structures, a comparison between a change of the quadrature error signal and a change of the angular velocity measurement signal is performed. It is found that the change of the quadrature error signal is greater than the change of the angular velocity measurement signal by 10-20 times. For the same structure, a ratio of the change of the quadrature error signal and the change of the angular velocity measurement signal is basically invariable. It can be seen that the quadrature error signal is more sensitive to the external force compared with the angular velocity measurement signal. Thus, as long as the external force is controlled to be within an appropriate range, the gyroscope can be configured to detect the external force without affecting its normal function (angular velocity measurement).

In other embodiments, in order to guarantee measurement accuracy of the angular velocity when the gyroscope is configured to detect the external force, a quantification result obtained by the detection on the external force is adopted to correct measurement data of the angular velocity, such that an influence of the external force on the measurement accuracy of the angular velocity can be controlled to be within an extremely small range.

The above embodiments are described with a uniaxial gyroscope as an example. The principle of the uniaxial gyroscope is the same as that of a biaxial gyroscope or the triaxial gyroscope. When the biaxial gyroscope or the triaxial gyroscope is used, the external force can be determined by a quadrature error signal of only one axis; and definitely, the external force can also be determined by quadrature error signals of two axes or detection signals of three axes.

According to the description of the above embodiments on using the accelerometer and the gyroscope to detect the external force, an inertial measurement unit (IMU) can also be configured to sense the external force in a way described above; that is, an accelerometer and/or a gyroscope in the IMU are/is configured to sense the external force.

Figure 6:
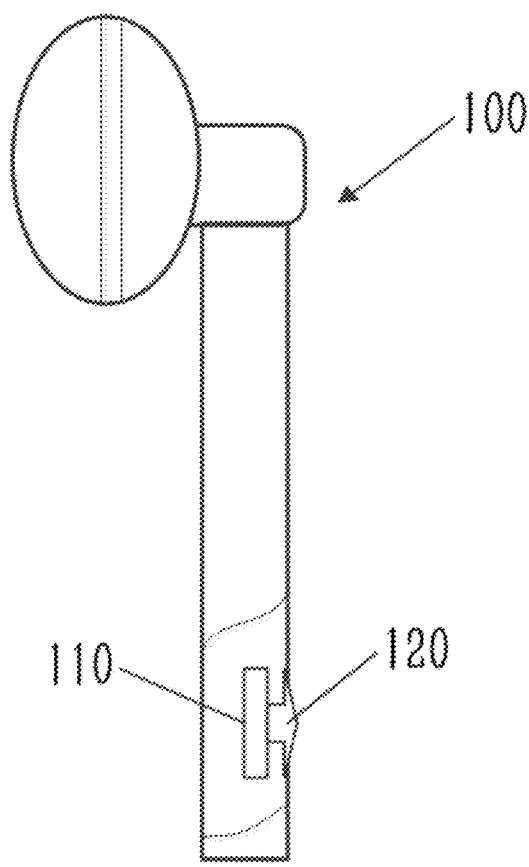
FIG. 6 shows a structural diagram of an in-ear headphone in an embodiment of the present disclosure.

FIG. 6 shows an in-ear headphone 100. An accelerometer 110 and a button component 120 in coordination with the accelerometer 110 are arranged in the in-ear headphone 100. An external force is applied to the accelerometer 110 by pressing the button component 120, such that the accelerometer 110 is deformed; and in this case, a detection signal is correspondingly changed. A specific determination, such as determination on the changes of Cs, Cr, Csq, or other detection items in the above embodiments, on the detection signal can reflect whether or not the accelerometer 110 is subjected to the external force.

For the in-ear headphone 100, if the external force is applied to the accelerometer 110, the button component 120 is pressed. A press on the button component 120 corresponds to one or more specific operational commands such as turn-on, standby, and pause which depend on duration of the external force in a current state of the in-ear headphone 100. For example, in a turn-on state of the in-ear headphone 100, a short press on the button component 120 indicates the pause, and a long press on the button component 120 indicates the standby.

Figure 7:
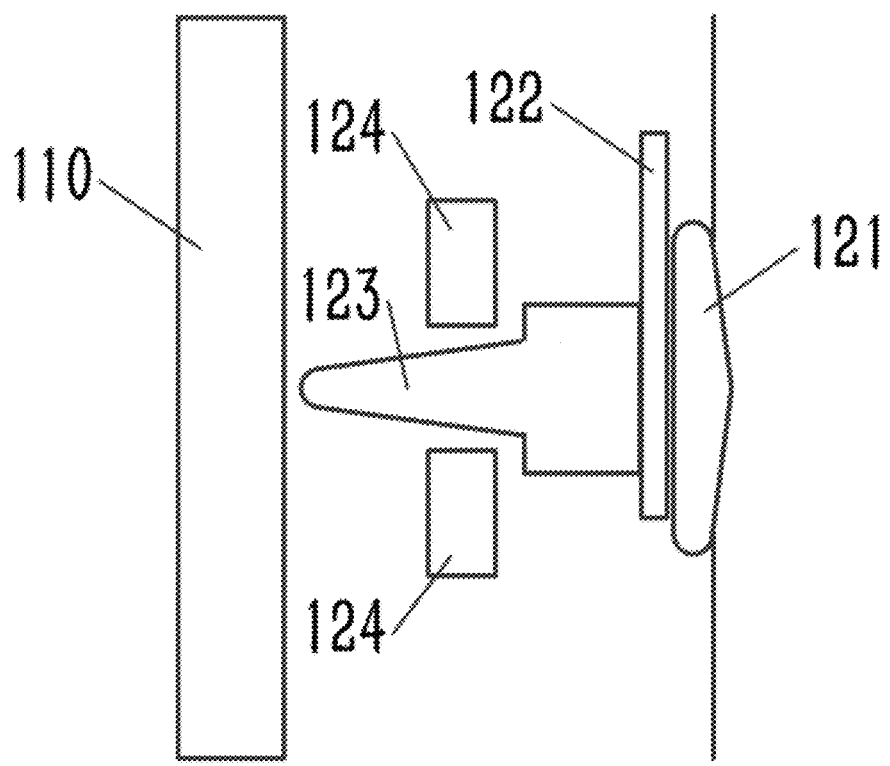
FIG. 7 shows a structure diagram of a button component in FIG. 6.

As shown in FIG. 7, the button component 120 includes a button cap 121, a spring piece 122, a rod part 123, and a limit part 124. The button cap 121 provides a pressing area for application of the external force. The spring piece 122 arranged in the in-ear headphone 100 is in coordination with the button cap 121 and has one end fixed into the in-ear headphone 100 and the other end connected to the rod part 123. When pressed, the button cap 121 moves towards the inside of the in-ear headphone 100. In this case, the spring piece 122 is driven by the button cap 121 to bend towards the inside of the in-ear headphone 100 and apply a force to the accelerometer 110 through the rod part 123. An acting point of the force applied by the rod part 123 to the accelerometer 110 is located at a symmetric center of the accelerometer. When not subjected to the external force, the button cap 121 returns to an initial position by the spring piece 122.

As described above, only if the deformation of the accelerometer and the gyroscope is controlled to be within a certain range, the influence of the deformation on normal functions of the accelerometer and the gyroscope can be controlled to be within an extremely small range or an acceptable range. For the in-ear headphone 100, a control over the deformation of the accelerometer 110 is equivalent to a control over a pressure from the button component 120. The rod part 123 can directly apply a force to the accelerometer 110. Therefore, the magnitude of the force is determined by a movable distance of the rod part 123. In this embodiment, a limit position of the rod part 123 moving towards the inside of the in-ear headphone 100 is defined by the limit part 124, such that the maximum force applied by the rod part 123 to the accelerometer 110 is limited. That is, the deformation of the accelerometer 110 can be controlled to be within a predetermined range.

Figure 8:
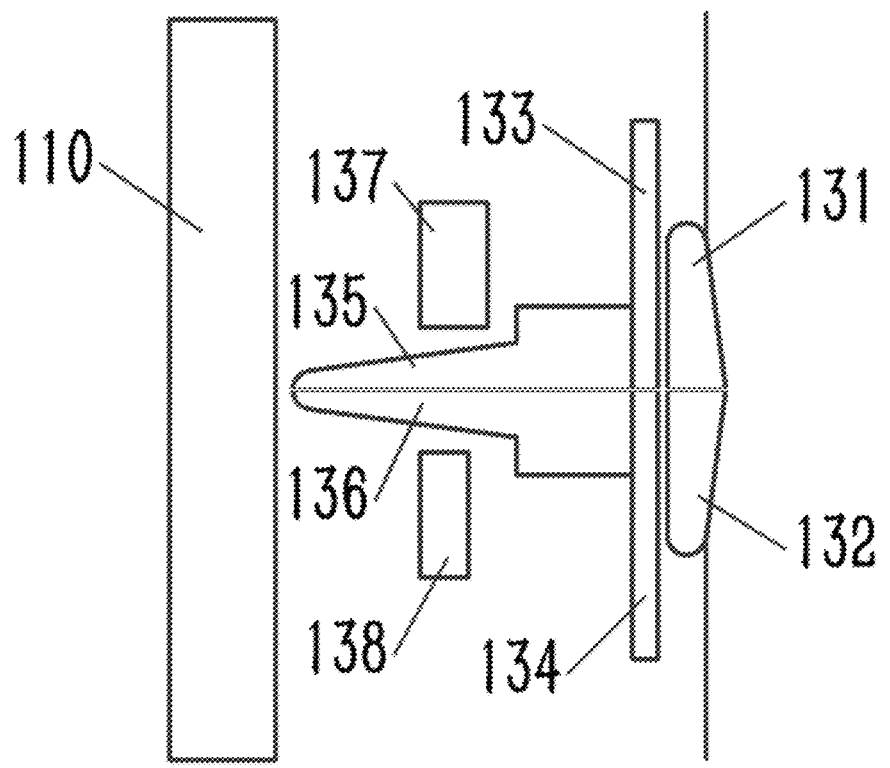
FIG. 8 shows a structure diagram of another button component.

As shown in FIG. 8, another optional button component 130 includes a button cap 131, a button cap 132, a spring piece 133, a spring piece 134, a rod part 135, a rod part 136, a limit part 137, and a limit part 138. The spring piece 133 arranged in the in-ear headphone 100 is in coordination with the button cap 131, and the spring piece 134 arranged in the in-ear headphone 100 is in coordination with the button cap 132. The spring piece 133 has one end fixed into the in-ear headphone 100 and the other end connected to the rod part 135, and the spring piece 134 has one end fixed into the in-ear headphone 100 and the other end connected to the rod part 136. The button component 130 has the same principle as the button component 120, and the difference from the button component 120 is that the button component 130 is provided with two buttons. The maximum forces applied by the two buttons to the accelerometer 110 are not equal. Limit positions of movements of the rod part 135 and the rod part 136 are respectively defined by the limit part 137 and the limit part 138. The limit part 137 and the limit part 138 are located at different heights, such that forces applied by the limit part 137 and the limit part 138 to the accelerometer 110 are not equal. Accordingly, the forces can be utilized as different control signals.

Figure 9:
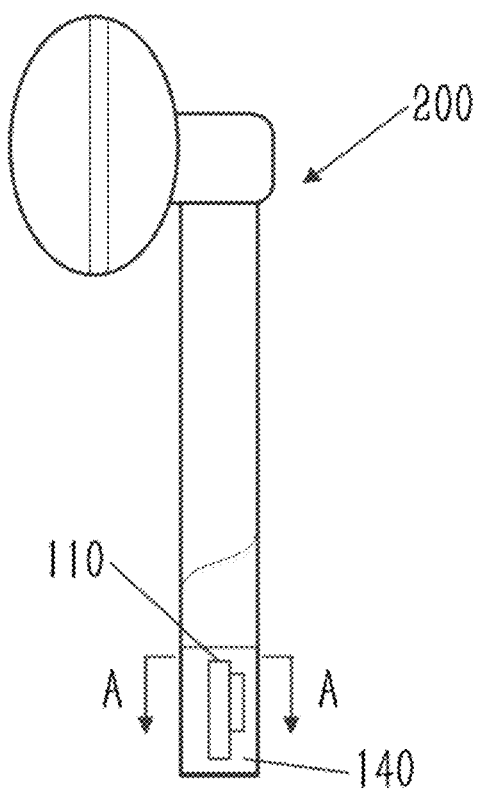
FIG. 9 shows a structural diagram of an in-ear headphone in another embodiment of the present disclosure.

FIG. 9 shows an in-ear headphone 200. An accelerometer 110 and an adjusting component 140 in coordination with the accelerometer 110 are arranged in the in-ear headphone 200.

Figure 10:
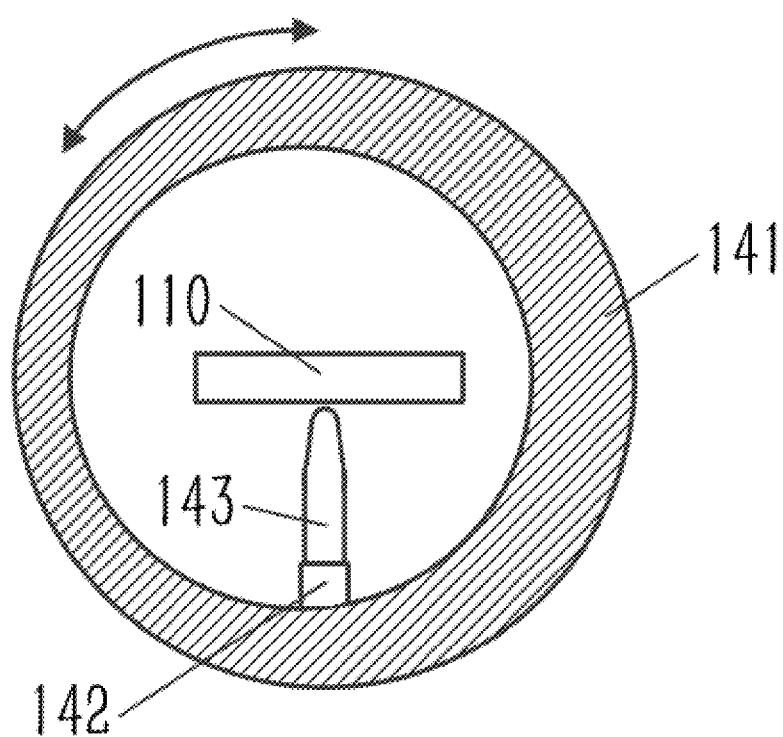
FIG. 10 shows a sectional view taken in an A-A direction in FIG. 9.

As shown in FIG. 10, the adjusting component 140 includes a knob 141, a spring piece 142, and a rod part 143. The knob 141 capable of rotating in a reciprocating manner is arranged at an end of the in-ear headphone 200. The spring piece 142 arranged in the in-ear headphone 200 is in coordination with the knob 141. The rod part 143 is fixedly connected to the spring piece 142. The spring piece 142 is attached to an inner wall of the knob 141. The inner wall of the knob 141 is gradually increased in thickness in the circumferential direction. In this way, during rotation of the knob 141, a position of the spring piece 142 (getting close to or getting away from the accelerometer 110) is varied with a difference of the thickness of the knob 141, such that a force applied by the rod part 143 to the accelerometer 110 is adjusted. An acting point of the force applied by the rod part 143 to the accelerometer 110 is located at a symmetric center of the accelerometer.

With respect to use of the accelerometer 110 in the in-ear headphone 100 and the in-ear headphone 200, a gyroscope can be configured to replace the accelerometer 110, and the same function can be obtained by sensing an external force through the gyroscope.

Figure 11:
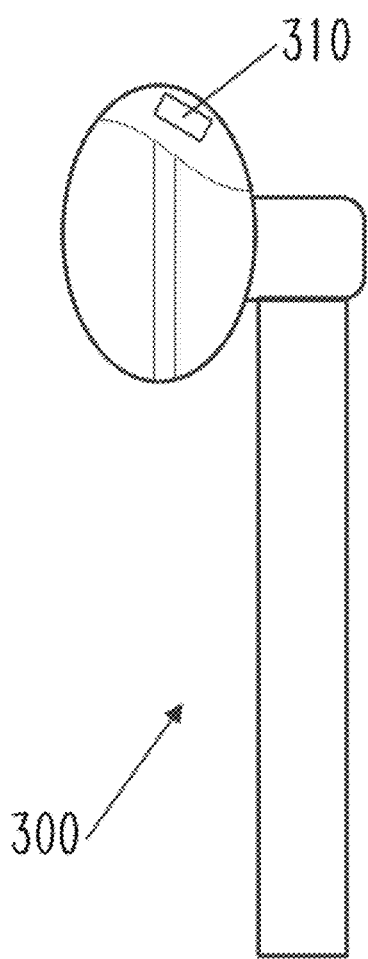
FIG. 11 shows a structural diagram of an in-ear headphone in a further embodiment of the present disclosure.

FIG. 11 shows an in-ear headphone 300. A gyroscope 310 is arranged in the in-ear headphone 300 and located in an area, inserted into an ear, of the in-ear headphone 300. In some prior in-ear headphones, a pressure sensor is arranged in the area to determine whether or not the headphone is inserted into the ear. The gyroscope 310 can also be configured to detect the external force, and thus can be arranged in the area to replace the pressure sensor for determining whether or not the headphone is inserted into the ear.

The embodiments in which the accelerometer and the gyroscope are used in the in-ear headphone aims at explaining that the accelerometer and the gyroscope can achieve measurements on their acceleration and angular velocities and can be used as pressure sensing devices in corresponding electronic products, and a way of use is not limited to that described above. The prior trigger switch and sensing devices can both configured to fulfill the application of the accelerometer and the gyroscope to pressure sensing.

The use of the accelerometer and gyroscope as the pressure sensing devices is described above with the in-ear headphone as an example. Many electronic devices provided with accelerometers and/or gyroscopes, such as a headset, an air mouse, an AR device, and a VR device, and can set corresponding functions based on the pressure sensing of the accelerometer and the gyroscope. For example, the pressure sensing can be adopted as an input of a control command, an indication of a pressed state, and the like. Especially for the electronic products which need both an inertial sensor and the pressure sensor, the pressure sensors can be replaced with the accelerometer and/or the gyroscope. In this way, the cost of the products is effectively lowered, and the size of the products is reduced.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can obtain based on the prior art through logical analysis, reasoning, or finite experiments according to the concept of the present disclosure shall fall within the protection scope defined by the appended claims.

What is claimed is:

1. An application method of an accelerometer, the method comprising:
processing a detection signal of the accelerometer, wherein based on an influence of a strain deforming an external housing of the accelerometer, generated under an action of an external force, the detection signal is adapted to reflect the external force, wherein the accelerometer comprises a detection capacitor, wherein the detection signal is equivalent to a capacitance measurement value defined by the detection capacitor, wherein acceleration and the external force are reflected by the capacitance measurement value, wherein the detection capacitor comprises a first detection capacitor and a second detection capacitor, wherein the first detection capacitor defines a first capacitance measurement value, and the second detection capacitor defines a second capacitance measurement value, wherein the first capacitance measurement value and the second capacitance measurement value are changed in opposite directions, wherein the acceleration is reflected by a difference between the first capacitance measurement value and the second capacitance measurement value, wherein, when the strain is generated on the accelerometer, the external force is reflected by a corresponding change of the first capacitance measurement value and/or the second capacitance measurement value;
converting the first capacitance measurement value and the second capacitance measurement value into a detection item by an operation, wherein a detection reference limit is set; and
in response to the detection item exceeding the detection reference limit or a threshold value set based on the detection reference limit, determining that the external housing of the accelerometer is deformed due to the external force.

2. The application method according to claim 1, wherein a magnitude of the external force is reflected by an extent of the detection item exceeding the detection reference limit.

3. The application method according to claim 1, wherein a sum of the first capacitance measurement value and the second capacitance measurement value is taken as the detection item, and the detection reference limit is set accordingly.

4. The application method according to claim 1, wherein a sum of a reciprocal of the first capacitance measurement value and a reciprocal of the second capacitance measurement value is taken as the detection item, and the detection reference limit is set accordingly.

5. The application method according to claim 1, wherein a sum of a square of the first capacitance measurement value and a square of the second capacitance measurement value is taken as the detection item, and the detection reference limit is set accordingly.

6. The application method according to claim 1, wherein a value of the acceleration measured by the accelerometer is corrected based on the detection item.

7. The application method according to claim 1, wherein the accelerometer is a multiaxial accelerometer, and wherein the detection signal corresponds to of at least one axis of the multiaxial accelerometer.

8. An accelerometer configured to perform the application method according to claim 1.

9. A sensor, comprising the accelerometer according to claim 8.

10. An electronic device, comprising the accelerometer according to claim 8.

11. The electronic device according to claim 10, wherein the external force is sensed through the accelerometer to achieve a control over the electronic device and/or to perform a determination on a state of the electronic device, and wherein the electronic device further comprises a drive component, wherein the drive component is correspondingly configured to directly or indirectly act on the accelerometer, such that the strain is generated on the accelerometer by applying a force to the drive component.

12. The electronic device according to claim 10, wherein the external housing is an external housing of the electronic device, wherein the external force is a first external force, and wherein the electronic device further comprises a gyroscope configured to process a detection signal of the gyroscope, wherein based on an influence of a second strain deforming the external housing, generated under an action of a second external force, the detection signal of the gyroscope is adapted to reflect the second external force, wherein the gyroscope comprises a gyroscope detection capacitor, wherein the detection signal of the gyroscope is defined by the gyroscope detection capacitor, wherein an angular velocity measurement signal and a quadrature error signal are demodulated from the detection signal of the gyroscope to respectively reflect an angular velocity and the second external force, wherein a reference limit of a quadrature error is set; wherein the gyroscope is further configured to perform a comparison between the quadrature error signal and the reference limit of the quadrature error to determine whether the external housing is deformed due to the second external force, and wherein, in response to the quadrature error signal deviating from the reference limit of the quadrature error or a threshold value set based on the reference limit of the quadrature error, the gyroscope is configured to determine that the external housing is deformed due to the second external force,
wherein the accelerometer and the gyroscope are respectively arranged at different positions of the electronic device to respectively sense the first external force and the second external force at the different positions.

13. An application method of a gyroscope, the method comprising:
processing a detection signal of the gyroscope, wherein based on an influence of a strain deforming an external housing of the gyroscope, generated under an action of an external force, the detection signal is adapted to reflect the external force, wherein the gyroscope comprises a detection capacitor, wherein the detection signal is defined by the detection capacitor, wherein an angular velocity measurement signal and a quadrature error signal are demodulated from the detection signal to respectively reflect an angular velocity and the external force, wherein a reference limit of a quadrature error is set;
performing a comparison between the quadrature error signal and the reference limit of the quadrature error to determine whether the external housing of the gyroscope is deformed due to the external force; and
in response to the quadrature error signal deviating from the reference limit of the quadrature error or a threshold value set based on the reference limit of the quadrature error, determining that the external housing of the gyroscope is deformed due to the external force.

14. The application method according to claim 13, wherein a magnitude of the external force is reflected by an extent of the quadrature error signal deviating from the reference limit of the quadrature error.

15. The application method according to claim 13, wherein a value of an angular velocity measured by the gyroscope is corrected based on a change of the quadrature error signal.

16. The application method according to claim 13, wherein the gyroscope is a multiaxial gyroscope, wherein the detection signal corresponds to at least one axis of the multiaxial gyroscope.

17. A gyroscope configured to perform, sensing the external force by the application method according to claim 13.

18. A sensor comprising the gyroscope according to claim 17.

19. An electronic device comprising the gyroscope according to claim 17.

20. The electronic device according to claim 19, wherein the external force is sensed through the gyroscope to achieve a control over the electronic device and/or to perform a determination on a state of the electronic device, and wherein the electronic device further comprises a drive component, wherein the drive component is correspondingly configured to directly or indirectly act on the gyroscope, such that the strain is generated on the gyroscope by applying a force to the drive component.

\* \* \* \* \*